United States Patent [19]
Ross et al.

[11] Patent Number: 5,553,139
[45] Date of Patent: Sep. 3, 1996

[54] METHOD AND APPARATUS FOR ELECTRONIC LICENSE DISTRIBUTION

[75] Inventors: Cliff D. Ross, Pleasant Grove; Neil W. Taylor, Springville, both of Utah

[73] Assignee: Novell, Inc., Orem, Utah

[21] Appl. No.: 223,093

[22] Filed: Apr. 4, 1994

[51] Int. Cl.$^6$ ................................ H04L 9/00; H04L 9/32
[52] U.S. Cl. ..................... 380/4; 380/9; 380/23; 380/25; 380/49; 380/50; 340/825.31; 340/825.34
[58] Field of Search ................. 380/4, 9, 23, 25, 380/46, 49, 50; 340/825.31, 825.34

[56] References Cited

U.S. PATENT DOCUMENTS

| | | | |
|---|---|---|---|
| 4,924,378 | 5/1990 | Hershey et al. | 380/4 X |
| 4,937,863 | 6/1990 | Robert et al. | 380/4 |
| 5,103,476 | 4/1992 | Waite et al. | 380/4 |
| 5,182,770 | 1/1993 | Medveczky et al. | 380/4 |
| 5,204,897 | 4/1993 | Wyman | 380/4 |
| 5,222,134 | 6/1993 | Waite et al. | 380/4 |
| 5,260,999 | 11/1993 | Wyman | 380/4 |
| 5,287,408 | 2/1994 | Samson | 380/4 |

*Primary Examiner*—Bernarr E. Gregory
*Attorney, Agent, or Firm*—Snell & Wilmer

[57] ABSTRACT

A method and apparatus that allows for the distribution of electronic licenses is disclosed. The method and apparatus may be used in a network or non-network environment to facilitate product licensing and upgrades. Further, the method and apparatus accommodate the use of compact disc read-only media (CD ROM) product distribution. The method and apparatus provide the ability to disable electronically distributed material. Further, the method and apparatus provide the ability to license use of the material by some entity in the distribution chain. The method and apparatus protect multiple electronic licenses by disabling the license such that an enabler key is necessary to enable a license for use. The method and apparatus reduce the cost of electronic distribution by providing the ability to distribute multiple products, product versions, and licenses that are unusable prior to the execution of an enablement procedure. The method and apparatus provide the ability to take advantage of the benefits of CD ROM, or any other (high capacity or otherwise), distribution media. For example, a generic distribution CD-ROM can be manufactured for a wider enduser base that contains multiple product and licensing options. An enduser can contact a fulfillment entity to purchase products contained on the distribution CD-ROM. In return, the enduser receives enabling information that can be used with an enablement procedure operating on the consumer's computer system to enable the purchased product(s). The method and apparatus can be used with a network server product that limits connection access electronically using connection-stratified server connection licenses or connection-stratified server executable files.

4 Claims, 5 Drawing Sheets

५,५५३,१३९

METHOD AND APPARATUS FOR ELECTRONIC LICENSE DISTRIBUTION

BACKGROUND OF THE INVENTION

1. Field of the Invention

The present invention relates to the field of electronic license distribution systems.

2. Background Art

In a non-networked environment, licensing of computer software can be accomplished on a user-by-user basis. That is, a license may be authorized based on the number of physical copies of a computer software program (e.g., application, operating system, etc.) purchased by a user.

In a networking environment, one physical copy of a software program can be licensed for use by multiple users. In this case, the number of users, or connections, is not based on the number of physical copies of a software program. One copy of a software program to execute in a network environment can be licensed for a certain number of users or connections. Thus, licensing in a non-network environment cannot be used to license software in a network environment.

In a network environment, an existing server contains software (e.g., operating system and application software) that may need to be upgraded. For example, a new version of software may become available. Further, it may become necessary to upgrade the number of connections allowed for a software program.

A prior art licensing scheme in a network environment addresses the licensing of network software (e.g., server's operating system). FIG. 6A is a diagram illustrating network software including a "burned in" license. The diagram shows that software 610 comprises executable portion 610A and license 610B, wherein the license 61 0B becomes a permanent part of software 610. This licensing system encrypts a serial number and application number. The encrypted result is placed in a specific location on the network server. Under this scheme, the encrypted serial and application numbers become a permanent part of the server (i.e., are "burned in").

In another prior art method, software distribution using Compact Disc Read-Only Memory (CD ROM) has become increasingly popular because of a CD ROM's capacity and durability. FIG. 6B is a prior art diagram illustrating storage of executable 620 on a CD ROM that has no intrinsic value. License 622 that contains value may be distributed together with software 620 or separately. Because of its storage capacity, a CD ROM can be used to store multiple products (e.g., software applications) and licensing schemes. Thus, for example, it is possible for a manufacturer offering an extensive product line to distribute its product line using the CD ROM media. Unless the products are protected in some manner, all of the products shipped are accessible to a purchaser that may not have purchased the entire line. Thus, it is necessary to implement a scheme to disable the products shipped on CD ROM. Further, to enable those products that are purchased. The license 622 may be obtained electronically or otherwise when the licenses are too numerous or complex or both to be verbally from a licensing center.

SUMMARY OF THE INVENTION

The present invention allows for the distribution of electronic licenses. The present invention can be used in a network or non-network environment to facilitate product licensing and upgrades. Further, the present invention accommodates the use of compact disc read-only memory (CD ROM) product distribution. The present invention provides the ability to disable electronically distributed material. Further, the present invention provides the ability to license use of the material by some entity in the distribution chain.

The present invention protects multiple electronic licenses by disabling the license; it requires an enabler key to enable a license for use. The present invention reduces the cost of electronic distribution by providing the ability to distribute multiple products, product versions, product features, and licenses that are unusable prior to the execution of an enablement procedure. An application may still be able to execute; it may be able to be upgraded dynamically by the addition of the necessary license(s). Thus, it is essentially the execution of particular licensable functions, features, etc., that are enabled by the present invention.

Thus, the present invention provides the ability to take advantage of the benefits of CD-ROM, or any other (high capacity or otherwise), distribution media. For example, a generic distribution CD-ROM can be manufactured for a wider enduser base. The generic CD-ROM can contain multiple products, product features, and product versions. The CD-ROM can be shipped to an enduser interested in purchasing one or more products, product features, and product versions. The enduser can contact a fulfillment entity to purchase products contained on the distribution CD-ROM. In return, the consumer receives enabling information that can be used with enablement software operating on the enduser's computer system to enable the purchased product(s). The enabling information may comprise the complete license or the information needed to create a complete license. Information that the user provides, such as user's name, may become part of the enabling information. Thus, the personalized information may be used to identify the licensor, for example.

The present invention provides the ability to delay the choice of product or product version until installation or pre-installation. The present invention can be used with a network server product that limits connection access electronically using connection-stratified server connection licenses or connection-stratified server executable files.

DETAILED DESCRIPTION OF THE INVENTION

A method and apparatus for electronic license distribution is described. In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

The present invention employs a scheme for creating, extracting, transferring, enforcing, and managing electronic licenses as described in U.S. patent application Ser. No. 08/192,166, filed on Feb. 4, 1994, entitled "METHOD AND APPARATUS FOR ELECTRONIC LICENSING" and assigned to the assignee of the present invention. The licenses created using this scheme consist of a clear text portion and an encrypted portion.

Figure 5:
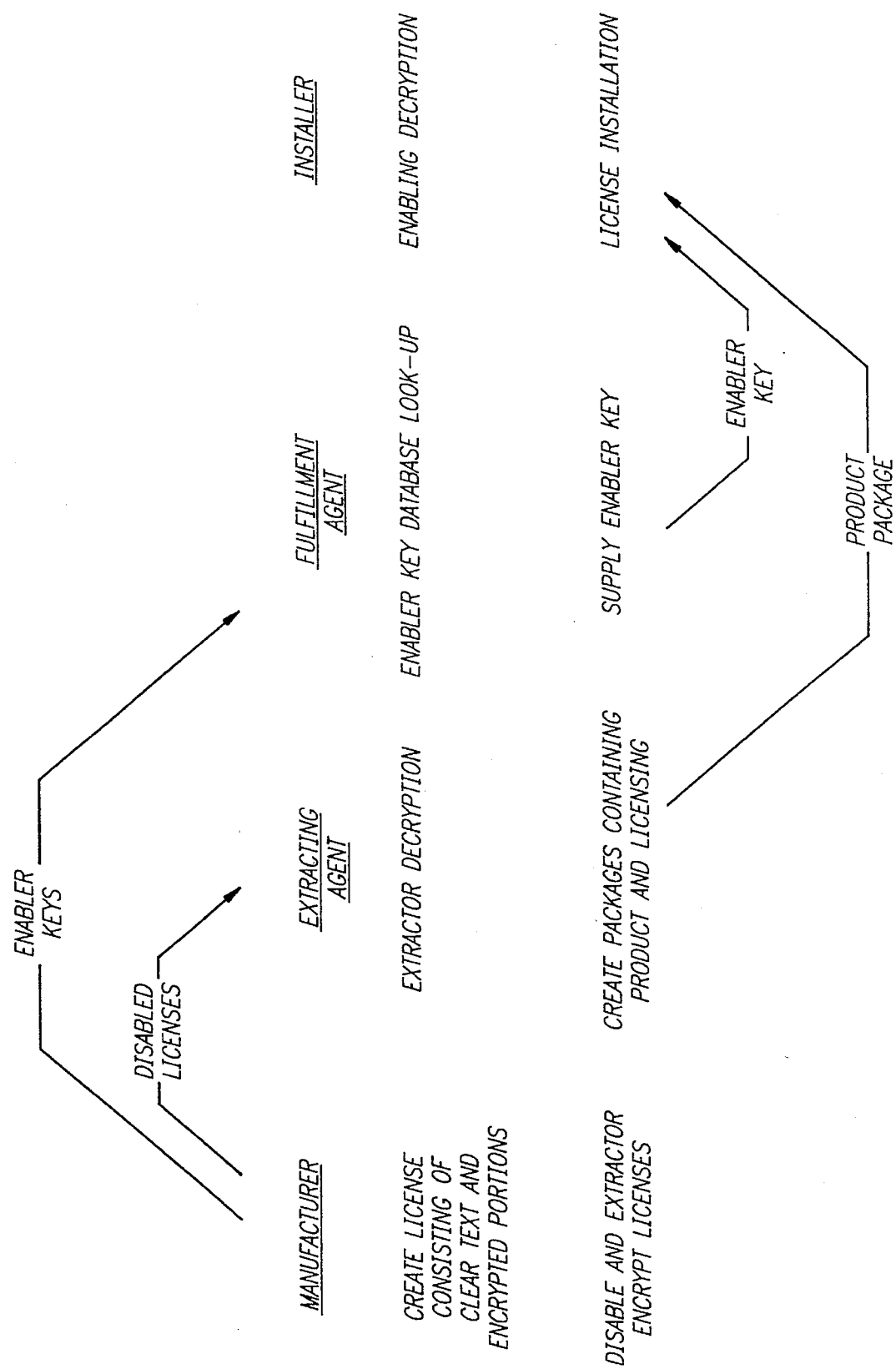
FIG. 5 is a flow diagram illustrating an overview of the distribution process of the present invention.
Figure 6A:
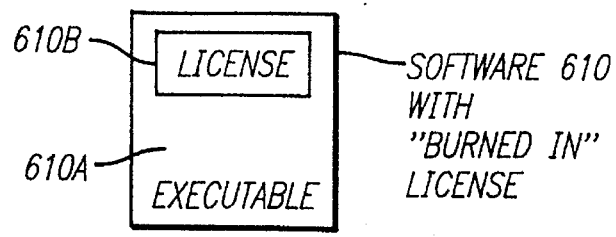
FIGS. 6A and 6B are diagrams illustrating prior art licensing schemes.
Figure 6B:
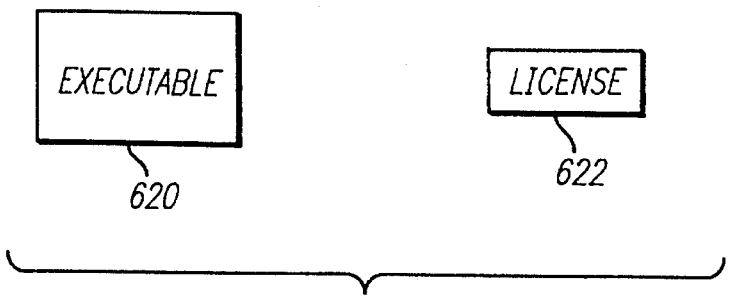

FIG. 5 illustrates an overview of the distribution process of the present invention. After an electronic license has been created and a portion of the license encrypted, the present invention disables the license for distribution. A license is disabled (i.e., doubly-encrypted) using a special encryption algorithm that is applied to the encrypted portion of a license. An enabler key is created during the encryption process. The enabler key may comprise a serial number, number of connections (i.e., number of network connections allowed at one time), major and minor product version identifiers, ten random numbers, and three checksum values. The enabler key is stored in a enabler key database that is shipped to a fulfillment agent (e.g., an extractor or other member of the distribution chain).

During disablement, a checksum is generated based on information in the license and the enabler key. Further, the doubly-encrypted portion of a license is again encrypted using an extractor's password. An extractor's password is a unique value assigned to an extractor (e.g., Manufacturer, Original Equipment Manufacturer or another reseller).

Disabled licenses are shipped to the extraction agent. Using its extractor's password, an extractor can decrypt the extractor encryption from the license. The result of this process is a disabled (i.e., doubly-encrypted) license. Disabled licenses are packaged with the product(s) and license(s) and shipped to an installer (i.e., enduser or other installer). An installer can select the product and licensing combination(s). Using this selection, the installer obtains the enabler key from the fulfillment agent. The installer uses the enabler key to enable the desired product licensing selection. The product and license can then be installed on an enduser's system. Alternatively, the license may distributed without disablement when it is not necessary to do so. A license (containing enabling information) may be distributed without disabling it when all licenses can be communicated by a fulfilling entity, e.g., by a voice operator. Thus, for example, the license may be distributed without disablement when it is not too large for a voice operator to fulfill (communicate) it in its entirety at once in a short time and in a manner that is simple for the enduser to receive and understand.

Figure 7:
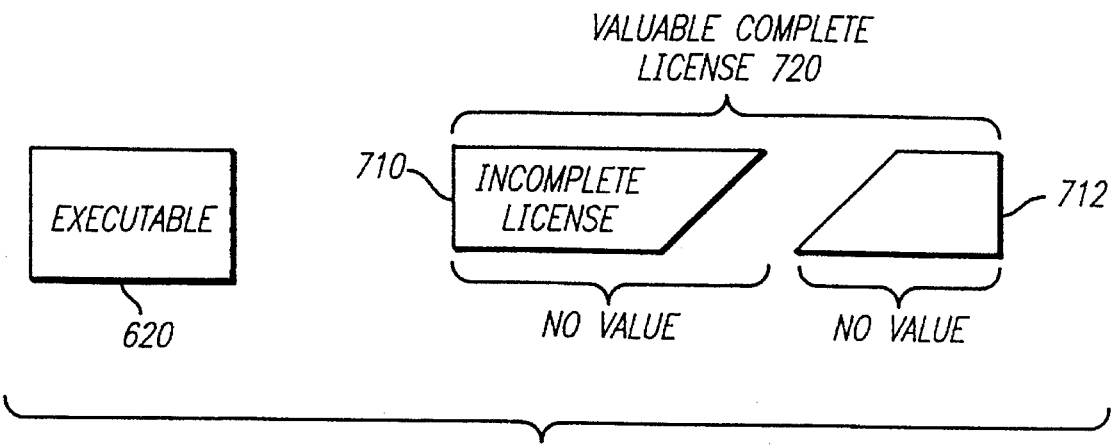
FIG. 7 is a diagram illustrating the licensing scheme of the present invention.

The present invention can be used to provide the ability to distribute one or more product and licensing combinations on a single distribution media (e.g., Compact Disc-Read Only Memory, "CD-ROM"). FIG. 7 is a diagram illustrating the licensing scheme of the present invention that provides flexible distribution. The diagram illustrates software (i.e., executable) 620 and license 720. The valuable, complete license 720 may comprise incomplete license 710 that has no value. An enable key 712 that has no value may be procured electronically or by voice operator. Because licenses are disabled and cannot be enabled with an enabler key, the products supplied on a CD-ROM are protectable. A product becomes operable only when a enabler key is obtained from a fulfillment entity. Thus, the present invention provides the ability to reduce the costs of distribution by allowing multiple product distribution with a single distribution.

Another application for the present invention involves the distribution of demonstration versions of a product. Before, a demonstration distribution contained only a demonstration version of a product. Using the present invention, a demonstration distribution may contain both demonstration and production versions of products. Initially, a demonstration version is enabled, and a production version is disabled. After assessing the product using the demonstration version, an enduser may purchase the production version, obtain an enabler key, and (using an enablement routine) enable the production version. Thus, only one distribution was needed.

Figure 1:
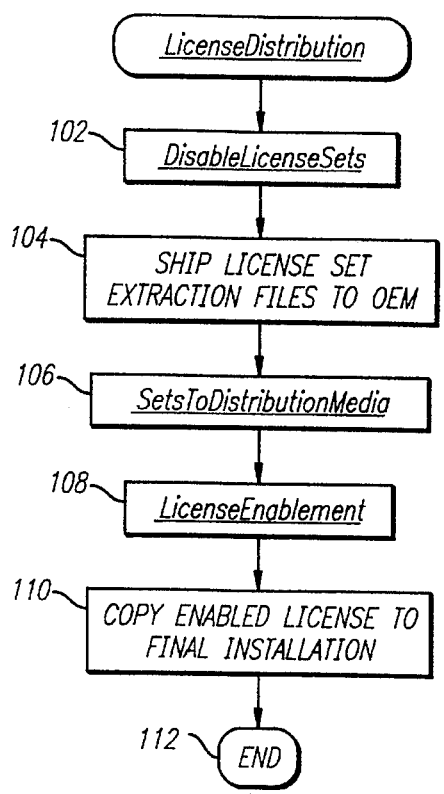
FIG. 1 is a flow diagram illustrating a LicenseDistribution overview.

FIG. 1 illustrates a LicenseDistribution overview flow. At block 102, disableLicenseSets is invoked to disable one or more sets of electronic licenses. At block 104, license set extraction files are provided to an extractor. At block 106, setsToDistributionMedia is invoked to receive, extract and transfer electronic licenses to a final distribution media (e.g., CD-ROM). Further, a decryption process is performed using an extractor's password. At block 108, licenseEnablement is invoked to decrypt the disabled portions of the license. At block 110, the enabled license is copied to a secure directory of a computer system on which the license is to be used. At block 112, processing ends.

LICENSE DISABLEMENT

Once license sets (i.e., one or more licenses) are created, the present invention provides the ability to disable the licenses to further protect the licenses. In the present invention, disablement includes the generation of a random number using a random number generator. In the preferred embodiment, a random number generator provided in Borland Inc.'s Application Program Interface (API) library is used. However, any random number generator may be used with the present invention without departing from the scope of the present invention. The random number generated identifies an offset within an encrypted portion of a license. For example, a license having 320 positions comprises 160 positions for the clear text portion and the remaining 160 positions for the encrypted portion.

The encrypted value found at the offset within the encrypted area is encrypted a second time using the random number as the encryption key. The random number is appended to an Enabler key and added to a checksum. This process can be repeated multiple times. For example, if this double-encryption technique is performed ten times, ten locations within the encrypted portion of a license can be doubly-encrypted.

After a license is disabled using this double-encryption technique, the encrypted portion of the license is again encrypted using an extractor's (e.g., reseller's) password and RSA's Bsafe RC2 secret key encryption algorithm. This can be used to protect the licenses while in transit to the extracting agent.

The final checksum comprised of information from the license and the random numbers generated during disablement is broken up into byte-size pieces and stored at multiple locations in the enabler key. The checksum can be broken down to any number of byte-size pieces and stored in the same number of locations within the enabler. Further, the enabler key and license information (e.g., serial number, number of connections, major product version, and minor product version) are stored as a record in an enabler key database.

An enabler key database comprising enabler keys is supplied to a fulfillment agent. Given licensing information, a fulfillment agent can supply an enabler key to an enduser or installation agent for use in the enablement process; the licensing information may comprise product numbers and the number of connections, for example. That is, a fulfillment agent can access the enabler key database using the licensing information supplied by the installation agent or enduser and extract the enabler key associated with the desired license. Once the fulfillment agent supplies the enabler key, the customer can execute an enablement procedure on the installation computer system and, using the enabler key, enable the desired license.

The double-encryption process can be performed on each license in a license set. A license set can contain multiple licenses, each licensing some number of connections for a given product or version of a product. As each license in a set is disabled using the above technique, it can be put in a buffer. Once all of the licenses in the set have been processed, the license set can be appended to a license inventory extraction database file. Each inventory extraction database file is given a unique name that identifies the different versions of license sets contained in a particular database file. License inventory extraction database files are distributed to an extractor (i.e., reseller or manufacturer).

Statistical information associated with the license set creation session can be appended to a sessions database. Such information includes a session identifier, a starting serial number, a number of licenses created, a last serial number, a manufacturer identifier, license flags, and an extractor password. Any value may be used to identify a session. For example, the session identifier can be initialized to a time that a session is begun. This value can be represented by the total number of seconds since 1980. Any other value can be used to identify a session.

The first serial number used on the first license set is retained in the starting serial number field. The number of licenses created indicates the total number of license sets created in the session, or batch. The last serial number used in the last set of licenses created in the session is retained in the last serial number field. A manufacturer identifier value indicates the identification number of the extracting agent for whom the license sets were created.

License flags indicate the license flags that were set in each license in set. License flags can be used to provide licensing information such as type of license and required, associated licenses. The password used with the RC2 encryption on the encrypted area of the server connection license is stored in the extractor password field.

Figure 2:
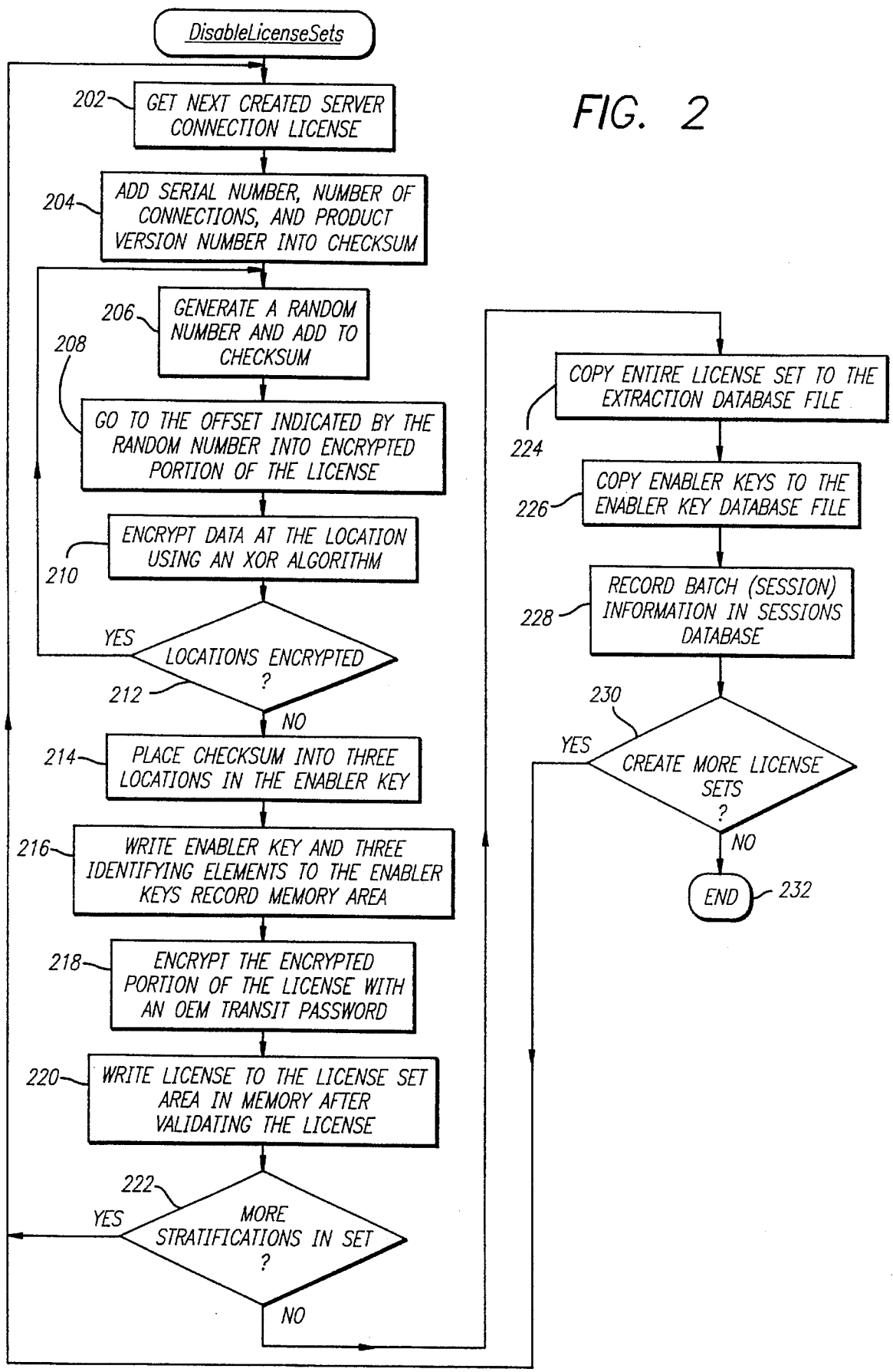
FIG. 2 is a flow diagram illustrating a disableLicenseSets process.

FIG. 2 illustrates a disableLicenseSets process flow. In block 202, an electronic license, i.e., a server connection license, is obtained from storage. In block 204, a checksum is generated using a serial number, number of connections, i.e., network connections, and product version number values. In block 206, a random number is generated, which is added to the checksum generated in block 204.

The checksum includes of the number of connections allowed by a license, the serial number of the license, and the major and minor product version numbers. For example, a version number "3.01" comprises a major product number "3" and a minor product number "01". The serial number is the same for every license in each license set within each product or product version. The number of connections can vary based on the product, version of the product, and/or the manufacturer's licensing policy. Further, a series of random numbers are included in the final checksum value for a license.

At blocks 208 and 210, a value in the encryption area of the electronic license and at the position indicated by the random number is encrypted. At decision block 212 (i.e., "locations encrypted?"), when all locations (e.g., ten positions) have not been disabled, processing continues at block 206 to disable the remaining positions. When all locations are disabled, processing continues at block 214.

At block 214, the checksum is split into byte-size pieces, and each byte is placed at different locations within an enabler key. An enabler key is used to enable a disabled license. An enabler key includes the serial number, number of connections, and major and minor product version numbers associated with a license. Further, the enabler key includes the randomly generated number(s) that identify the disabled locations within the encrypted portion of the license. At block 216, the enabler key, serial number, number of connections and product version number (i.e., major and minor version numbers) are retained in memory.

At block 218, the doubly-encrypted portion of the license is encrypted using an extractor's password. At block 220, the license is written to a license set area in memory (e.g., Random Access Memory, RAM). At decision block 222 (i.e., "more stratifications in set?"), when there are additional licenses in the license set (e.g., licenses allowing a different number of connections), processing continues at block 202 to get the next license in the license set. When all of the licenses in a set have been processed, processing continues at block 224 to copy the license set stored in memory to an extraction database file.

At block 226, the enabler key(s) associated with the license(s) in the license set are written to an enabler key database file. At block 228, information related to this session can be written to a sessions database. At decision block 230 (i.e., "more stratifications in set?"), when additional license sets are to be created, processing continues at block 202 to get a next license. When additional license sets are not created, processing ends at block 232.

DISTRIBUTION

Inventory extraction database files are transferred to an extracting agent. The extracting agent can incorporate the inventory extraction database files to extracting agent's inventory extraction database. Licenses can be extracted from the extracting agent's inventory extraction database to a final distribution media for transmittal to a purchaser. The number of different types or versions of license sets and the format (e.g., multiple types of licenses on the same distribution media) used in placing them on the final distribution media (e.g., floppy diskette and CD-ROM).

During extraction, a license is read into memory. The license's encrypted area is decrypted using Bsafe's RC2 secret key decryption algorithm. The license is stored in a file on the distribution media. The name of the file indicates the number of connections allowed by the license. Subdirectories can further be used to segregate multiple types or version of a product's licenses placed on the same distribution media. The subdirectory names can be used to represent license set's types and versions. A license set type can reflect a product or a product version.

Figure 3:
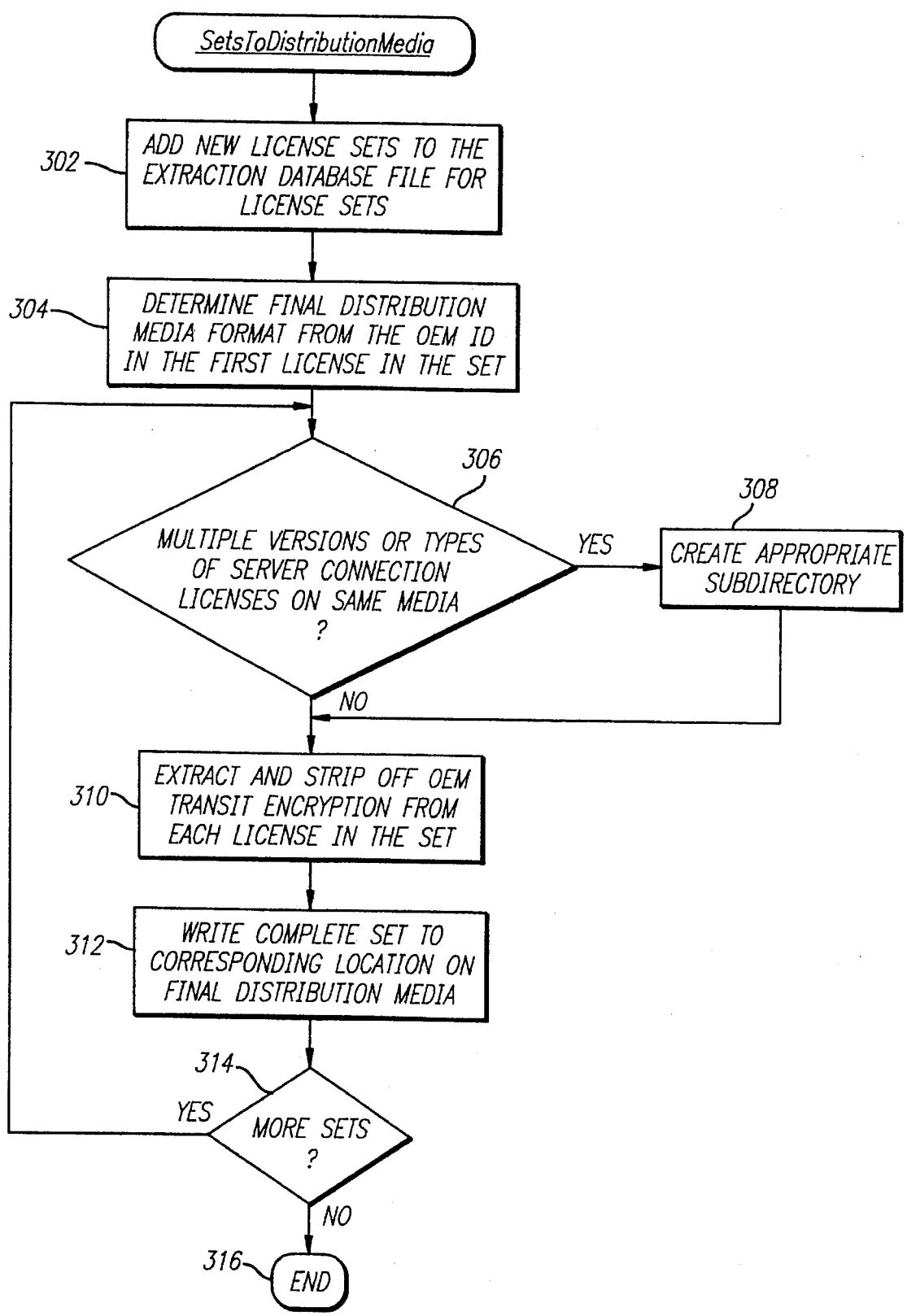
FIG. 3 is a flow diagram illustrating a setsToDistributionMedia process.

Disabled licenses can be shipped to an extraction agent (e.g., reseller or manufacturer). An extractor can extract and transfer license sets to a final distribution media for shipment (e.g., to an enduser or installation agent). FIG. 3 illustrates a setsToDistributionMedia process flow. At block 302, the disabled licenses shipped to an extraction agent are added to the extraction agent's license extraction database file. At block 304, a final distribution. media format can be determined based on the extraction agent's identification value in a license in a license set.

At decision block 306 (i.e., "multiple versions or types of server connection licenses on same media?"), when multiple versions or types of licenses are included on the same distribution media, processing continues at block 308 to create subdirectories to store the multiple licenses. Processing continues at block 310. When multiple versions or types of licenses are not included, processing continues at block 310.

At block 310, licenses are extracted from the license extraction database, and the extractor's encryption is stripped off each license in a set using a decryption algorithm and the extractor's password. At block 312, the license set is written to the final distribution media. At decision block 314 (i.e., "more sets?"), when additional license sets are intended on the same distribution media, processing continues at decision block 306 to process the remaining license sets. When additional license sets are not intended on the same distribution media, processing ends at block 316.

LICENSE ENABLEMENT

A licensing final distribution media is packaged with the product(s) for which it is associated and shipped to an installer. The licenses contained in the final distribution media must be enabled and installed to license a product for use. Thus, an enabling procedure must be executed to enable a license. The enabling procedure requires the enabler key to decrypt the encrypted portion of the license. The enabler key is available to the installer from a fulfillment agent upon payment of the purchase price of a product.

An enablement process executing on the system which the license is to be installed prompts an installer to select a product type and version and the desired features, etc. (e.g., one for a single-user system or multiple connections for a network environment). The version or product name, serial number, and the selected number of connections is displayed for verification. The product type, serial number, and number of connections are communicated by the installer to a fulfillment agent.

A fulfillment agent accesses the enabler key database using the product type, serial number, and number of connections information. Once the enabler key associated with this combination of information is extracted from the enabler key database by the fulfillment agent, and communicated to the installer.

The installer inputs the enabler key information to the enabling process. The enabling process performs a checksum using the enabler key to verify that the correct enabler key was given. The checksum further verifies that the correct enabler key values were entered by the installer in the correct order. Upon verification, the license is enabled using the offsets contained in the enabler key to decrypt the license. The enabled license can be copied to some media for later installation or be installed.

Figure 4:
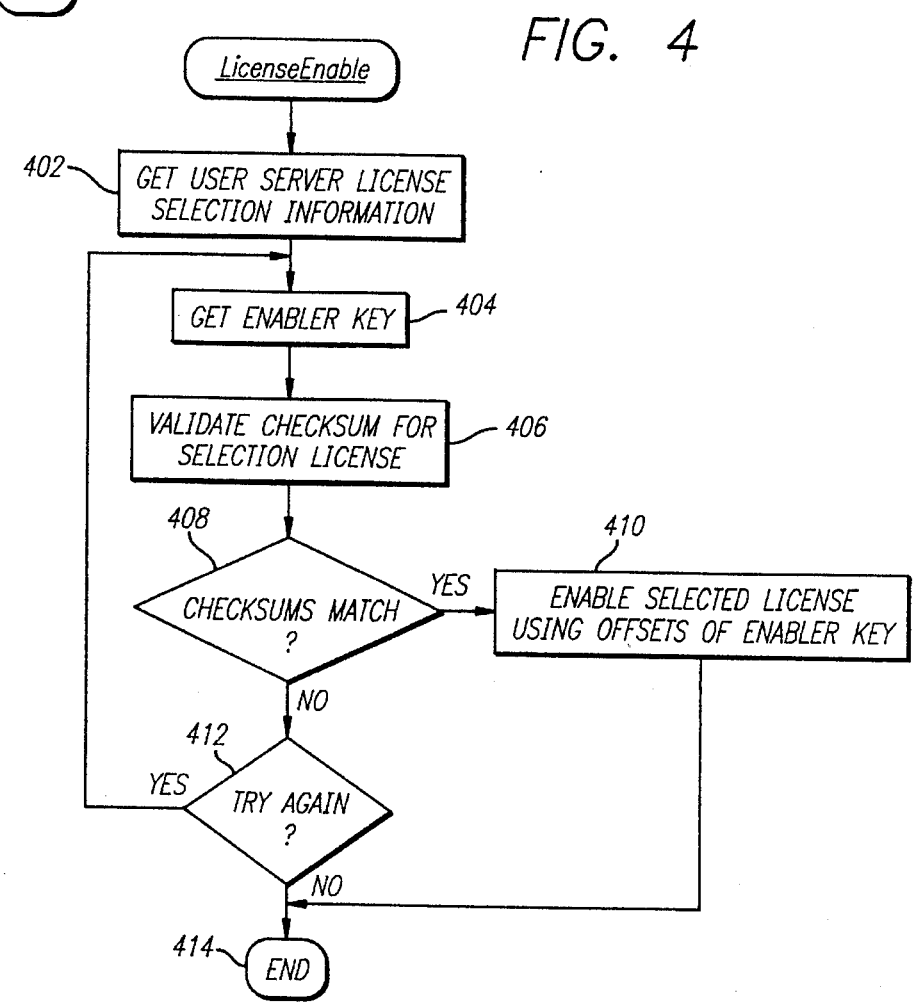
FIG. 4 is a flow diagram illustrating a licenseEnable process.

FIG. 4 illustrates a licenseEnable process flow. At block 402, license selection information is obtained. At block 404, an enabler key obtained from a fulfillment agent is obtained. At block 406, a checksum is generated using license information. At decision block 408 (i.e., "checksums match?"), when the checksum in the enabler key does not match the newly-calculated checksum, processing continues at decision block 412. At decision block 412 (i.e., "try again?"), when another attempt to validate an invalidated license is warranted (e.g., when a license was invalidated on the first attempt and multiple attempts are desired) processing continues at block 404 to prompt for the reentry of the enabler key. When another attempt to validate the license is not warranted., processing ends at block 414.

When, at decision block 408, the checksums match, processing continues at block 410 to enable the selected license using the random number value contained in the enabler key. Processing ends at block 414.

Thus, the present invention provides secure fulfillment, i.e., it provides the ability to distribute product and license packages such that a product and associated license are disabled from unauthorized use. Multiple packages can be distributed on a single distribution media thereby reducing the cost of distribution. The ability to distribute multiple packages on a single distribution media further provides the ability to utilize distribution media with increased capacity (i.e., CD-ROM). Selection of a product and corresponding license can be delayed until immediately prior to installation on an enduser's computer system. One or more products and associated licenses can be selected and an enabler key obtained. Enablement of a license and product requires the use of a process (i.e., an enablement process) executing on a computer system. The enablement process uses the enabler key to enable the license.

Thus, a method and apparatus for electronic license distribution has been provided.

We claim:

1. A method of electronic licensing distribution comprising the steps of:

creating a plurality of electronic license sets, each of said electronic license sets associated with one of said plurality of products, each electronic license set comprised of a plurality of electronic license;

disabling said plurality of electronic licenses in said plurality of electronic license sets;

transferring electronic copies of a plurality of products to a final distribution medium;

transferring electronic copies of said plurality of electronic license sets to said final distribution medium;

distributing said final distribution medium to an enduser.

2. The method of claim 1 further including the steps of:

selecting by said enduser one of said plurality of products;

selecting by said enduser one of said plurality of electronic licenses;

obtaining by said enduser an enabler key from a fulfillment agent based on said one of said plurality of products and said one of said plurality of electronic license;

executing in a computer system an enablement process to enable said one of said plurality of electronic licenses.

3. The method of claim 2 further including the step of installing said one of said plurality of electronic licenses in said computer system.

4. The method of claim 2 wherein said enablement process comprises the steps of:

extracting, by said enablement process executing in a computer system, an offset, said offset representing a location of a value within an encrypted portion of said one of said plurality of electronic licenses;

decrypting said value at said offset using said offset as a decryption key.

* * * * *